(12) United States Patent
Gibbons

(10) Patent No.: US 8,780,534 B2
(45) Date of Patent: Jul. 15, 2014

(54) SWING OUT MOUNT

(75) Inventor: Donald Gibbons, Wake Forest, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 275 days.

(21) Appl. No.: 13/238,650

(22) Filed: Sep. 21, 2011

(65) Prior Publication Data

US 2013/0070395 A1   Mar. 21, 2013

(51) Int. Cl.
  *H02B 11/127* (2006.01)
  *H01H 9/22* (2006.01)
(52) U.S. Cl.
  CPC ............... *H02B 11/127* (2013.01); *H01H 9/22* (2013.01)
  USPC ........................................ 361/643; 200/50.18
(58) Field of Classification Search
  CPC .................................................... H02B 11/127
  See application file for complete search history.

(56) References Cited

U.S. PATENT DOCUMENTS

| | | | | |
|---|---|---|---|---|
| 2,767,266 A * | 10/1956 | Hawkins et al. | ........... | 200/50.26 |
| 3,192,446 A | 6/1965 | Meacham | .................... | 361/634 |
| 4,612,424 A * | 9/1986 | Clark et al. | ................ | 200/50.18 |
| 4,724,512 A * | 2/1988 | Bischof et al. | ................ | 361/642 |
| 5,025,171 A | 6/1991 | Fanta et al. | ..................... | 307/150 |
| 6,262,880 B1 | 7/2001 | Fischer et al. | ................ | 361/652 |
| 7,122,752 B2 * | 10/2006 | Nagai et al. | .................... | 200/315 |
| 7,821,775 B2 * | 10/2010 | Narayanasamy et al. | .... | 361/609 |
| 8,139,345 B2 * | 3/2012 | Christensen et al. | ......... | 361/615 |
| 2009/0046415 A1 * | 2/2009 | Rasmussen et al. | .......... | 361/644 |
| 2011/0310534 A1 * | 12/2011 | Cosley et al. | ................. | 361/632 |

FOREIGN PATENT DOCUMENTS

| | | | | |
|---|---|---|---|---|
| DE | 488113 C | 12/1929 | ............... | H01H 9/04 |
| DE | 19725135 A1 | 1/1998 | ............... | H02B 1/32 |
| EP | 0109555 A2 | 5/1984 | ............... | H02B 1/36 |
| EP | 0743730 | 10/2001 | ............... | H02B 1/32 |
| FR | 2738083 A1 | 2/1997 | ............... | H02B 1/32 |
| FR | 2842662 A1 | 1/2004 | ............... | H02B 1/36 |
| GB | 239660 A | 9/1925 | ............... | H01H 9/22 |

OTHER PUBLICATIONS

International Search Report mailed Nov. 23, 2012 issued in corresponding International Patent Application No. PCT/US2012/055723 (5 pages).
Written Opinion mailed Nov. 23, 2012 issued in corresponding International Patent Application No. PCT/US2012/055723 (5 pages).

* cited by examiner

*Primary Examiner* — Gregory Thompson
(74) *Attorney, Agent, or Firm* — Locke Lord LLP

(57) ABSTRACT

An electrical enclosure includes a housing, a moveable bracket, an electrical device, a lever, and a drive assembly. The housing has a door attached to a body. The moveable bracket couples the electrical device to the body. The lever is positioned outside of the housing and is configured to switch between OFF and ON lever positions. The drive assembly at least partially protrudes through an aperture of the body and is attached to the lever. The drive assembly includes a drive cog that directly moves the handle of the circuit breaker between OFF and ON handle positions when the electrical device is in an operational position and the lever is switched from the OFF to the ON lever position.

18 Claims, 7 Drawing Sheets

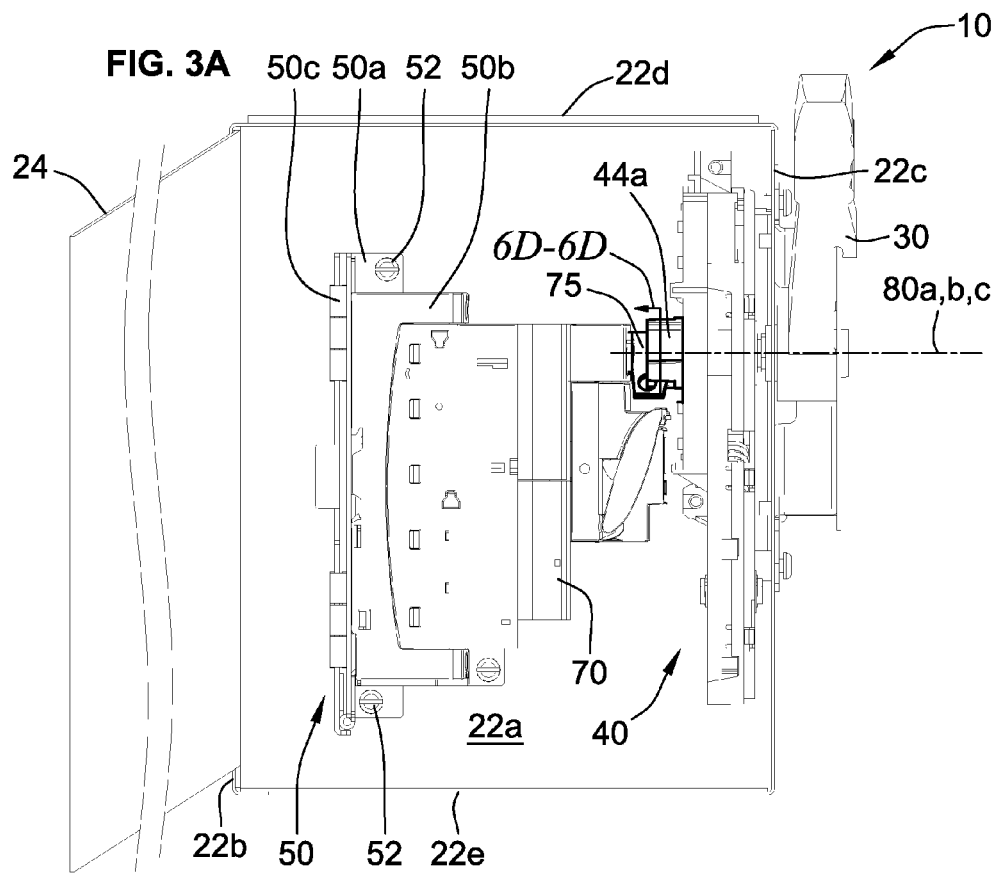
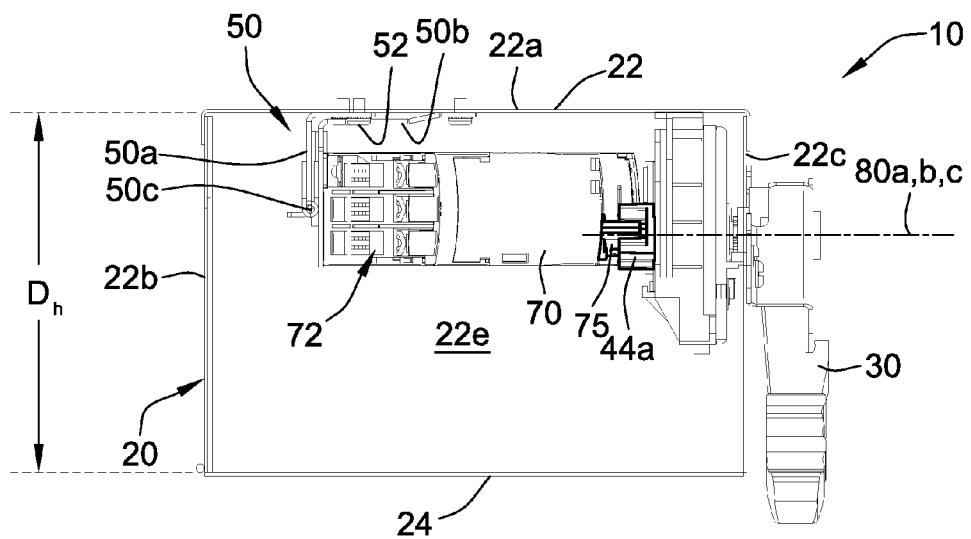

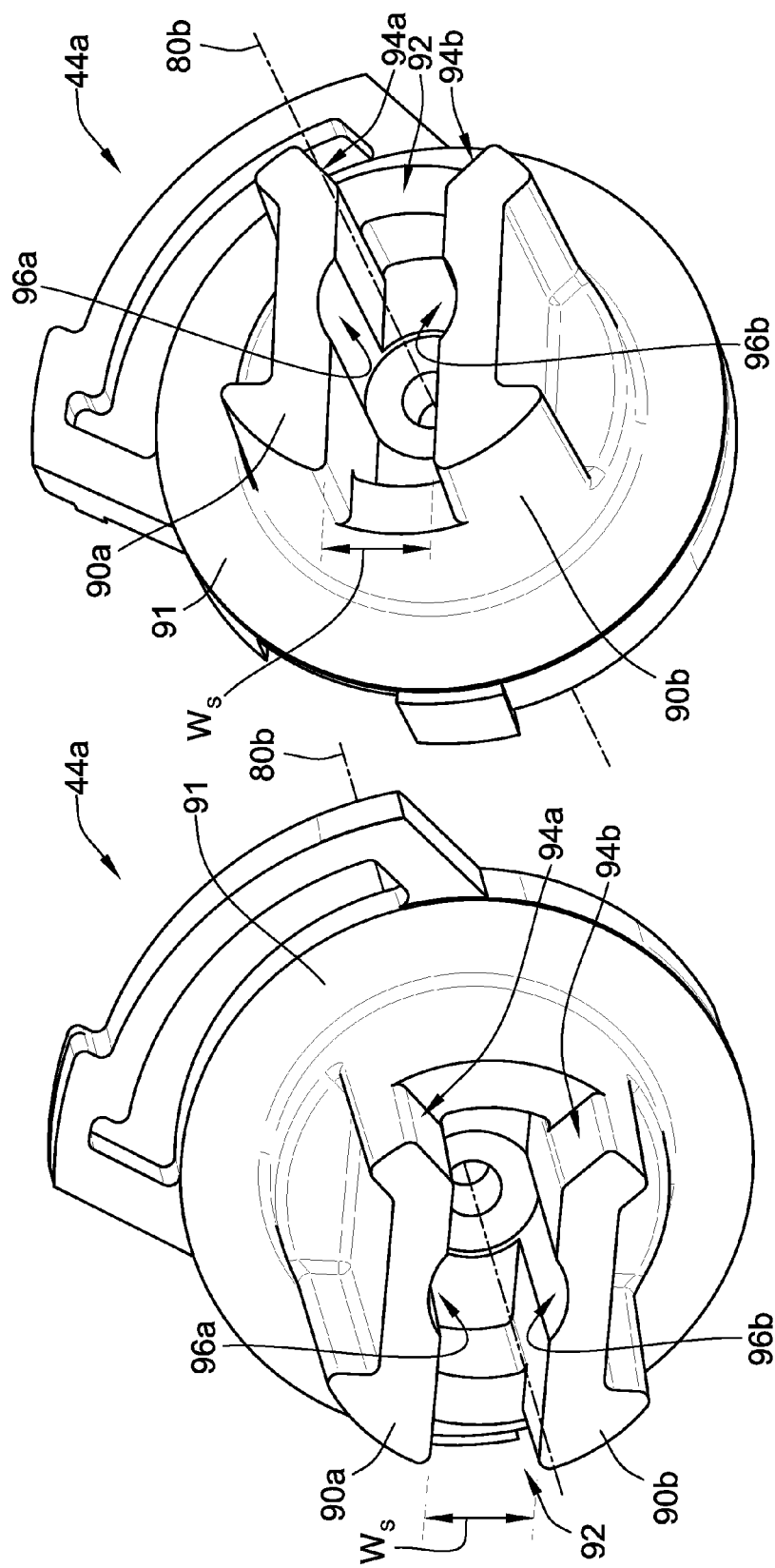

SWING OUT MOUNT

FIELD OF THE INVENTION

The present invention relates generally to electrical equipment and, more particularly, to electrical enclosures having one or more swing out mounts.

BACKGROUND OF THE INVENTION

Electrical enclosures, such as, for example, load centers or panelboards, typically include a main housing with a hinged door. These enclosures are typically mounted on or in a wall (e.g., a wall in a building or house) and typically enclose one or more circuit breakers and/or related electrical accessories in a side-by-side relationship therein. Each of the circuit breakers includes an actuator or handle that protrudes away from a back-side of the enclosure towards the hinged door. This relationship provides access to the handles of each circuit breaker when the hinged door of the enclosure is opened such that an operator can manually operate the handles to switch the various circuit breakers on and/or off.

In some instances, the enclosure includes an exterior lever that is configured to actuate one or more of the circuit breakers within the enclosure without having to open the hinged door. As the handles of the circuit breakers are disposed adjacent to an inner surface of the hinged door when the door is in the closed position, the exterior lever is mounted to the outside surface of the hinged door. Thus, when the hinged door is opened, the exterior lever is moved with the door. This is known as a "door mounted lever" which must be designed to lineup with the handle(s) of the circuit breaker(s) inside of the enclosure, which can be difficult to achieve and maintain. For example, over time the alignment of the hinged door can change due to wear and tear and/or operating conditions, which can directly affect the alignment of the door mounted lever with the handle(s) of the circuit breaker(s) therein. This can lead to problems actuating the circuit breakers and/or problems with securing the door in a closed position.

Traditionally, the depth of the main housing of the enclosure is a function of the depth of the circuit breakers (measured between the handle side and the opposite side of the circuit breaker, see, e.g., depth, d, in FIG. 1B) installed therein when the circuit breakers are installed in the side-by-side fashion. Thus, the larger the depth of the circuit breaker, the larger the depth of the enclosure that is needed to accommodate such circuit breakers. Providing enclosures with relatively larger depths that protrude off the walls to which they are attached can be undesirable in some or most applications.

Thus, a need exists for an improved apparatus. The present disclosure is directed to satisfying one or more of these needs and solving other problems.

SUMMARY OF THE INVENTION

The present disclosure is directed to a panelboard or electrical enclosure having a swing mounted electrical device (e.g., circuit breaker) that provides better access to the electrical device during service and/or routine maintenance of the electrical device. The swing mounted electrical device also allows for an overall depth of the electrical enclosure to be minimized and the electrical device(s) mounted therein can swing into a more compact orientation during operation of the electrical device(s) therein.

When the electrical device is swung into its compact operational position, the handle or actuator of the electrical device is positioned adjacent to a side wall of the electrical enclosure instead of the door. A lever is provided outside of the electrical enclosure housing and operatively coupled to the handle of the electrical device via a drive assembly that includes a drive cog. The drive cog is directly coupled with the handle of the electrical device such that switching of the lever from an OFF to and ON position directly causes the drive cog to turn the handle from an OFF to an ON position. The drive cog can include a tapered entrance and/or snap fitting features to aid itself in receiving and maintaining the handle within a slot of the drive cog.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 3A is a front view of the electrical enclosure of FIG. 1A with the circuit breaker in the operational position and a lever in an ON position according to some aspects of the present disclosure;

FIG. 3B is a top view of the electrical enclosure of FIG. 3A in a closed position with the top wall of the electrical enclosure removed for ease of explanation;

FIGS. 5A-5B are perspective views of a drive cog of the drive assembly of FIG. 4.

DETAILED DESCRIPTION OF THE ILLUSTRATED EMBODIMENTS

Although the present disclosure is described in connection with certain aspects and/or embodiments, it will be understood that the present disclosure is not limited to those particular aspects and/or embodiments. On the contrary, the present disclosure is intended to cover all alternatives, modifications, and equivalent arrangements as may be included within the spirit and scope of the present disclosure as defined by the appended claims.

Figure 1A:
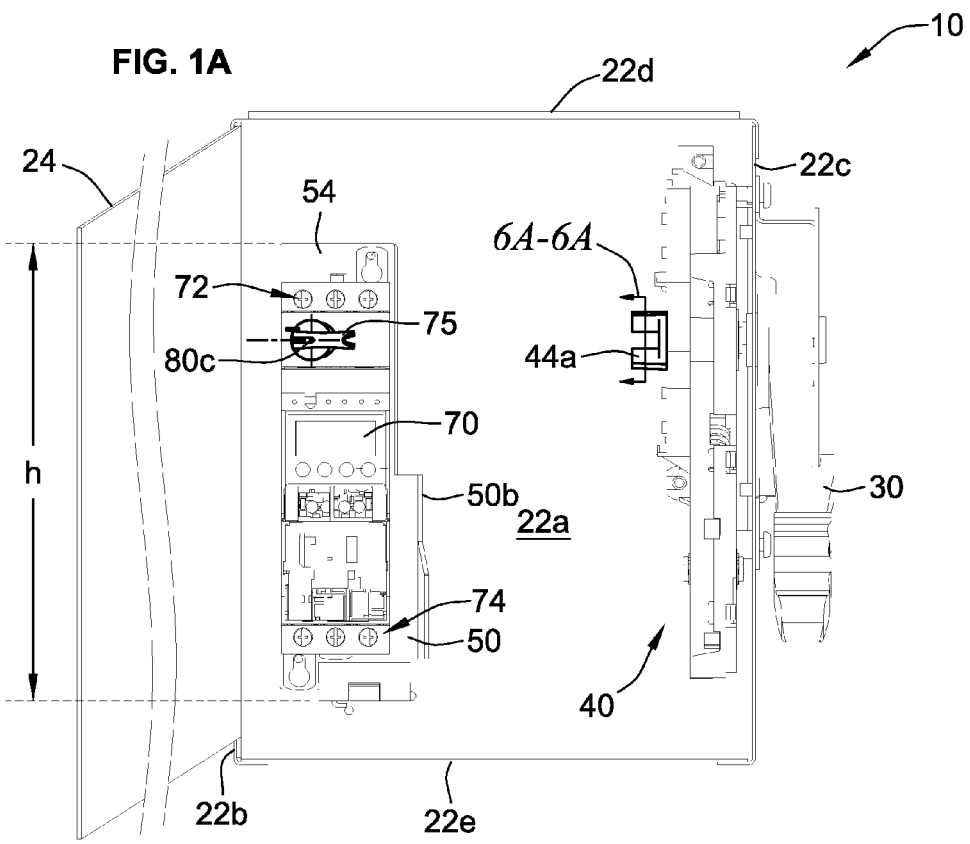
FIG. 1A is a front view of an electrical enclosure in an open position including a circuit breaker in a service position according to some aspects of the present disclosure.
Figure 1B:
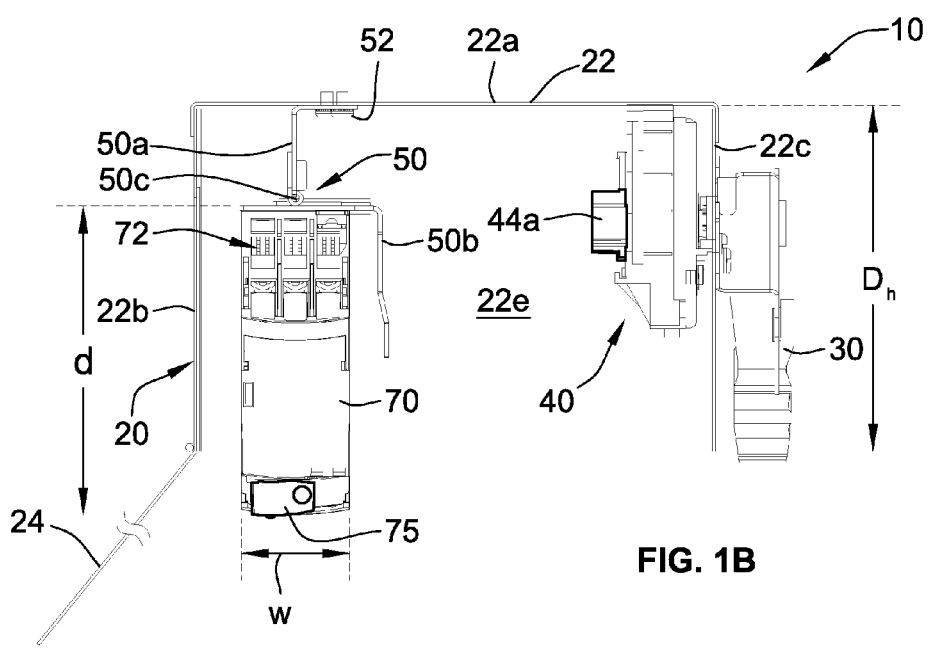
FIG. 1B is a top view of the of FIG. 1A with the top wall of the electrical enclosure removed for ease of explanation.
Figure 2A:
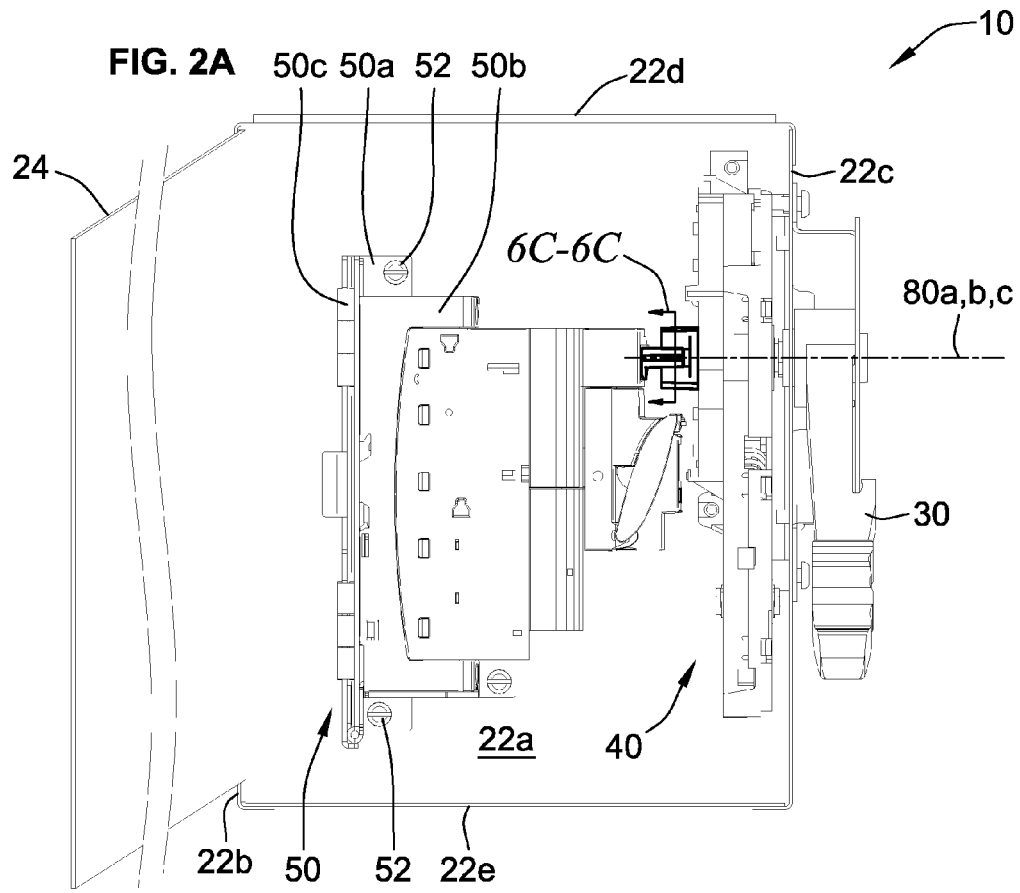
FIG. 2A is a front view of the electrical enclosure of FIG. 1A with the circuit breaker in an operational position according to some aspects of the present disclosure.
Figure 2B:
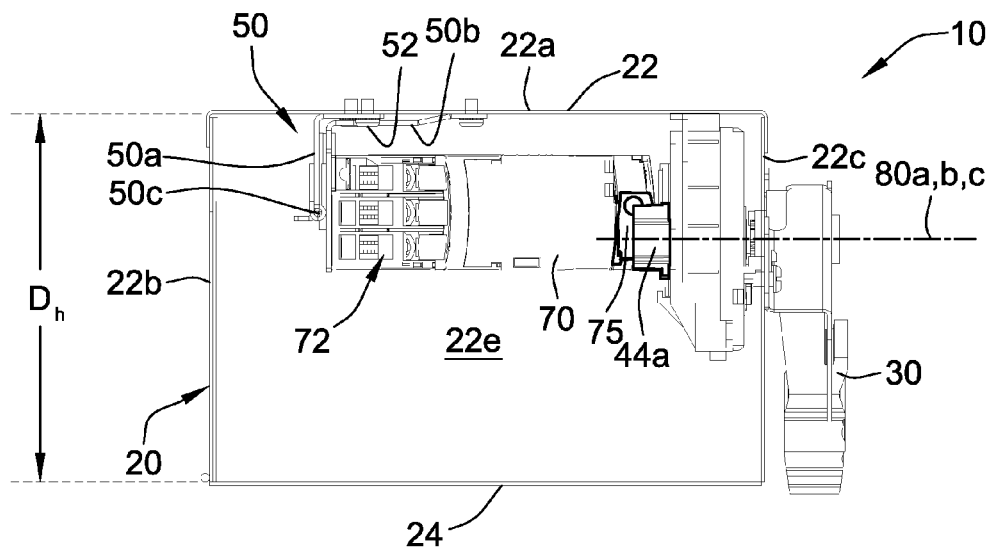
FIG. 2B is a top view of the electrical enclosure of FIG. 2A in a closed position with the top wall of the electrical enclosure removed for ease of explanation.

Referring to FIGS. 1A and 1B, an electrical enclosure or a panelboard 10 in an open position (i.e., door 24 is open) includes a housing 20, a lever 30, a drive assembly 40, a moveable bracket 50, and an electrical device 70. The housing 20 includes a body 22 and a door 24 hingedly coupled to the body 22. The door 24 is shown in an open position; however, the door 24 can be closed (as shown in FIGS. 2B and 3B) to seal and protect the internal contents of the electrical enclosure 10, such as, for example, the electrical device 70 (e.g., one or more circuit breakers) contained therein. The body 22 of the housing 20 has a base 22a, two opposing sides walls 22b,c, a top wall 22d, and a bottom wall 22e. The housing 20 can be made of a variety of materials including metal, plastic, fiberglass, and the like, or a combination thereof (e.g., the body can be made of metal and the door of plastic).

The lever 30 is positioned outside of the housing 20 and adjacent to the side wall 22c. The lever 30 is operable to switch between a first-lever position (shown in FIGS. 1A-2B) and a second-lever position (shown in FIGS. 3A-3B). The first-lever position and the second-lever position correspond with OFF and ON positions of the electrical enclosure 10, respectively. When the lever 30 is in the first-lever position (shown in FIGS. 1A-2B), the enclosure is in the OFF position. Similarly, when the lever 30 is in the second-lever position (shown in FIGS. 3A and 3B), the enclosure is in the ON position.

Referring to FIGS. 3A and 3B, the lever 30 is configured to be operatively coupled to a handle 75 of the electrical device 70 via the drive assembly 40. The handle 75 is moveable between a handle-OFF position (shown in FIGS. 1A-2B) and a handle-ON position (shown in FIGS. 3A and 3B). When the electrical device 70 is in the operational position (FIGS. 2A-3B), movement of the lever 30 from the first-lever position (FIGS. 1A-2B) to the second-lever position (FIGS. 3A and 3B), directly causes the handle 75 of the electrical device 70 to be moved or switched from the OFF position (FIGS. 1A-2B) to the ON position (FIGS. 3A and 3B).

As shown the moveable bracket 50 is positioned within the body 22 of the housing 20 and attached to the base 22a via one or more attachment means 52 such as, for example, one or more rivets, screws, nuts and bolts, welds, glue, etc. The moveable bracket 50 generally includes a first member 50a and a second member 50b that are hingedly coupled together, such as, for example, by a hinge 50c. Each of the first and the second members 50a, 50b is an "L" shaped bracket (best shown in FIG. 1B), although various other shapes for each of the member 50a, 50b are possible.

The second member 50b of the moveable bracket 50 generally provides a mounting surface and/or platform 54 for the electrical device 70 or electrical accessory (e.g., circuit breaker) to be attached thereto (see FIG. 1A), such that the electrical device 70 is hingedly coupled to the body 22 of the housing 20 via the moveable bracket 50. As shown, the electrical device 70 is mounted to the mounting surface 54 of the moveable bracket 50 such that the electrical device 70 can be moved relative to the body 22 of the housing 20 via the moveable bracket 50 in a swing-like fashion. The moveable bracket 50 and the attached electrical device 70 are configured to be angularly rotated between a first or service position (see e.g., FIGS. 1A and 1B) and a second or operational position (see e.g., FIGS. 2A-3B). The bracketed electrical device 70 can be rotated through an angle of at least about 30 degrees between the first or service position and the second or operational position. As shown, the bracketed electrical device 70 can be rotated through an angle of about 90 degrees between the first or service position and the second or operational position. Other magnitudes of rotation (not shown) between the first and the second positions of the moveable bracket 50 are contemplated, such as, for example, about 45 degrees, about 50 degrees, about 60 degrees, about 180 degrees, etc.

When the moveable bracket 50 is in the first-bracket position and the electrical device 70 is in the service position (FIGS. 1A and 1B), front, left, right, top, and bottom sides of the electrical device 70 are readily accessible by operators and/or maintenance personnel. Such a service position (FIGS. 1A and 1B) of the electrical device 70 provides additional clearance around the electrical device 70 during service as compared with an electrical device in a typical enclosure arrangement (not shown) where additional devices usually flank and/or abut both sides of the electrical device (e.g., a circuit breaker panel in a house with a plurality of circuit breakers). The service position of the electrical device 70 (FIGS. 1A and 1B) can increase the safety of the personnel performing, for example, routine maintenance and/or checks on the electrical device 70 as compared with the typical arrangement, as the service position provides additional clearance around the potentially live electrical lines (not shown) inside of the electrical enclosure 10.

When the moveable bracket 50 is in the second-bracket position and the electrical device 70 is in the operational position (FIGS. 2A-3B), the right and front sides of the electrical device 70 are obscured by the body 22 and the drive assembly 40, respectively. Additionally, due to the typical dimensions and/or size of electrical devices (i.e., relatively larger height (h) and depth (d) than width (w) as shown in FIGS. 1A and 1B), the electrical device 70 protrudes from the body 22 when in the service position (see e.g., FIG. 1B) but not when in the operational position (see e.g., FIGS. 2B and 3B). That is, as shown in FIG. 1B, a front portion of the electrical device 70 protrudes from the body 22 of the housing 20 such that the door 24 cannot be closed; however, as shown in FIGS. 2B and 3B, the electrical device 70 is entirely contained within the housing 20 when the moveable bracket 50 is in the second-bracket position and the electrical device 70 is in the operational position such that the door 24 can be closed. Such an arrangement of the electrical enclosure 10 including the moveable bracket 50 allows for the housing 20 to have a smaller overall depth, $D_h$, (see e.g., FIGS. 1B, 2B, and 3B) when compared with a typical arrangement where the electrical device is typically mounted within the housing such that the smallest dimension of the electrical device (i.e., the width) is parallel with an opening of the housing.

As shown in FIGS. 1B, 2B, and 3B, the electrical device 70 includes at least one input connector 72. Each of the at least one input connectors 72 is configured to receive and physically couple with a respective electrical wire (not shown) for distributing a respective phase of electricity from a power source (not shown). Similarly, as shown in FIG. 1A, the electrical device 70 includes at least one output connector 74. Each of the at least one output connectors 74 is configured to receive and physically couple to a respective electrical wire (not shown) for distributing a respective phase of electricity to one or more loads (not shown). The electrical wires (not shown) coupled with the electrical device 70 can be provided with a sufficient length within the electrical enclosure 10 to allow the moveable bracket 50 to pivot unimpeded. Additionally, one or more wire harnesses (not shown) can be provided to hold the electrical wires to the body 22 to aid in keeping the electrical wires out of the way of the moveable bracket 50 when the moveable bracket 50 is moved, for example, from the first-bracket position (FIGS. 1A-1B) towards the second-bracket position (FIGS. 2A-3B).

Figure 4:
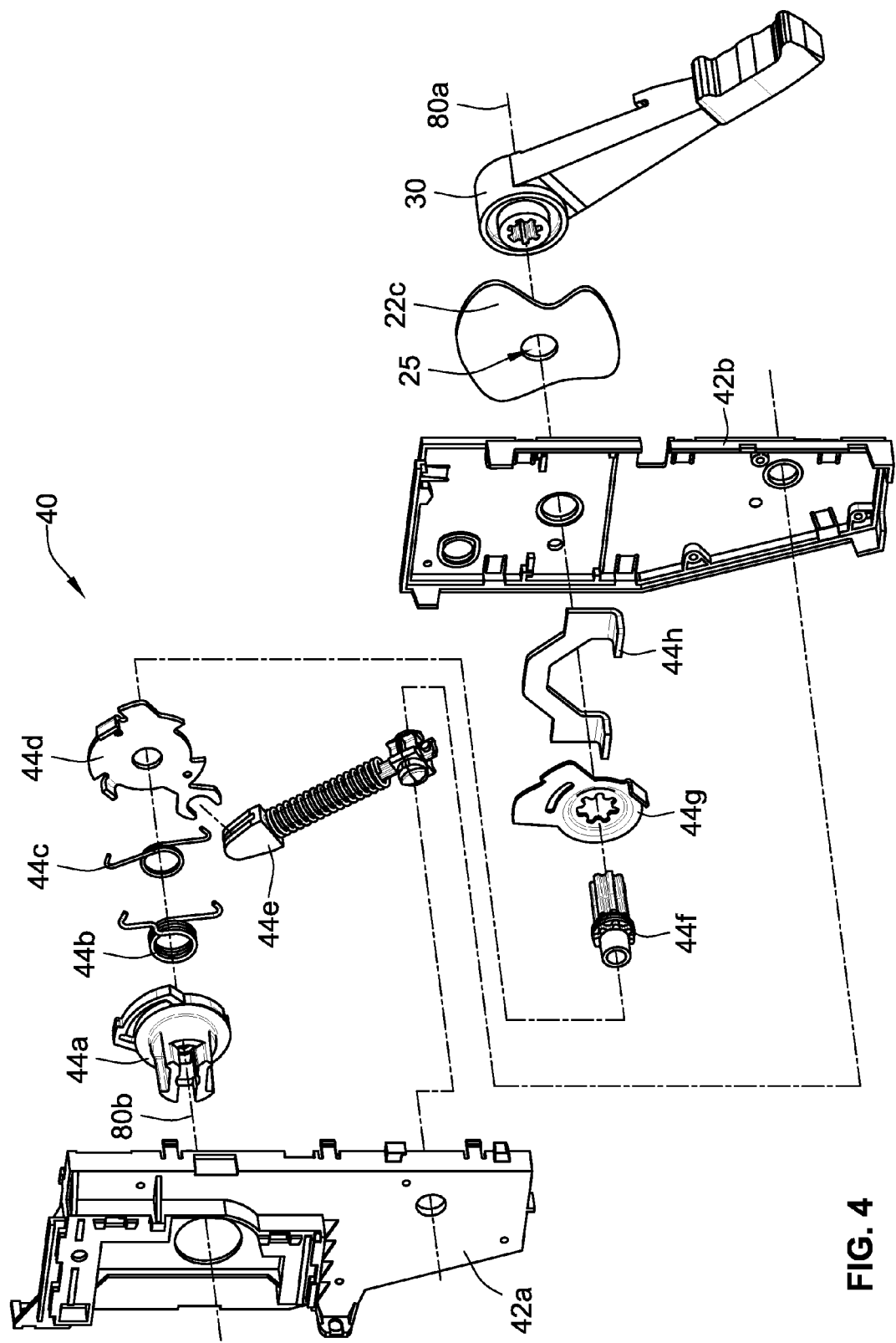
FIG. 4 is an exploded view of a drive assembly and lever of the electrical enclosure of FIG. 1A.

Referring to FIG. 4, the drive assembly 40 is shown in an exploded manner in reference to the side wall 22c of the body 22 and the lever 30. The drive assembly 40 includes first and second housing elements 42a,b that are configured to be coupled together to hold and/or enclose a plurality of drive assembly components 44a-h. The drive assembly 40 at least partially protrudes through an aperture 25 in the side wall 22c of the body 22 and is coupled to the lever 30. A majority of the drive assembly 40 is positioned within the body 22 of the housing 20 (see e.g., FIGS. 1A-3B). Only a portion of the drive assembly component 44f protrudes through the aperture 25 in the side wall 22c of the body 22. The drive assembly component 44f includes a fluted shape that fits into a corresponding portion of the lever 30.

The drive assembly components 44a-h are assembled such that rotation of the lever 30 about an axis of rotation 80a and/or movement of the lever 30 between the first-lever position (FIGS. 1A-2B) and the second-lever position (FIGS. 3A and 3B) directly causes a drive cog 44a of the drive assembly 40 to rotate about its central axis 80b a predetermined corresponding amount.

As shown in FIGS. 2A-3B, the axis of rotation 80a (also shown in FIG. 4) of the lever 30 is coaxial with the central axis 80b (also shown in FIG. 4) of the drive cog 44a and with an axis of rotation 80c (also shown in FIG. 1A) of the handle 75 of the electrical device 70 (when the electrical device 70 is in the operational position).

Referring to FIGS. 5A and 5B, the drive cog 44a includes a pair of fingers 90a,b that extends from a drive cog base 91. The drive cog base 91 can have a variety of shapes, sizes, apertures, slots, recesses, projections, etc. to interface with the other drive assembly components 44b-h such that movement of the lever 30 results in a corresponding movement of the drive cog 44a as described herein.

The fingers 90a,b are spaced apart to define a slot or channel 92 therebetween. The slot 92 has a width, $W_s$, that is sufficiently large to receive the handle 75 of the electrical device 70 therein (see e.g., FIG. 6C). The fingers 90a,b can be resilient such that during insertion of the handle 75, the fingers 90a,b can bend and/or flex such that the width, $W_s$, of the slot increases to accommodate the handle 75 therein.

Each of the fingers 90a,b includes a tapered portion 94a and 94b, respectively. The tapered portions 94a,b define a tapered entrance into the slot 92 that aids in guiding the handle 75 of the electrical device 70 when the moveable bracket 50 is moved from the first-bracket position (FIGS. 1A and 1B) to the second-bracket position (FIGS. 2A-3B). Various angles of taper are contemplated, such as, for example, the tapered portions 94a,b can be tapered at an angle with a magnitude of about forty-five degrees relative to horizontal (i.e., tapered portion 94a is positive forty-five degrees relative to horizontal and tapered portion 94b is negative forty-five degrees relative to horizontal).

Each of the fingers 90a,b includes a groove 96a and 96b, respectively. Each of the grooves 96a,b is configured to receive a corresponding protrusion 75a,b (shown in FIGS. 6A-6D) of the handle 75 when the handle 75 is engaged with the drive cog 44a (i.e., when the moveable bracket 50 is in the second-bracket position and the electrical device 70 is in the operational position, which is shown in FIGS. 2A-3B). The protrusions 75a,b (see FIGS. 6A-6D) on the handle 75 can be configured to engage the grooves 96a,b in the slot 92 in a snap-fitting manner. Further, snap fitting the handle 75 into the drive cog 44a (via the grooves 96a,b and protrusions 75a,b) can provide tactile feedback to aid in indicating that the handle 75 of the electrical device 70 is properly seated within the slot 92 of the drive cog 44a. For example, when the handle 75 is properly seated in the slot 92, a clicking and/or snapping sound can be made by the mechanical movements of the fingers 90a,b and the handle 75.

Figure 6A:
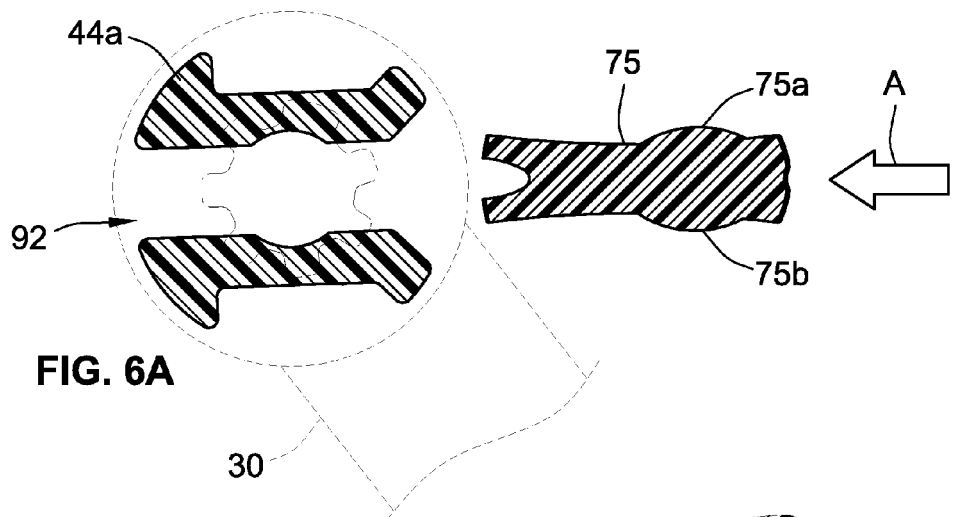
FIGS. 6A-6D are various cross sectional views of a handle of the circuit breaker of FIGS. 1A, 2A and 3A engaging the drive cog of FIGS. 5A-5B according to some aspects of the present disclosure.

Referring to FIGS. 6A-6D, movement of the components of the electrical enclosure 10 from an OFF-servicing position (FIGS. 1A and 1B) to an ON-operational position (FIGS. 3A and 3B) is illustrated by way of illustrative cross-sectional views of the drive cog 44a and the handle 75. Starting with the electrical enclosure 10 in the OFF-servicing position (FIGS. 1A and 1B), to turn ON the electrical enclosure 10 and the electrical device 70 installed therein, the moveable bracket 50 and the electrical device 70 coupled thereto are moved and/or rotated towards the second-bracket position (FIGS. 2A-3B) such that the electrical device 70 is in the operational position. Such a movement is illustrated in FIG. 6A as the device handle 75 is moved in the direction of arrow A towards engagement with the drive cog 44a. The lever 30 is also shown in phantom in the first-lever position (i.e., OFF).

Figure 6B:
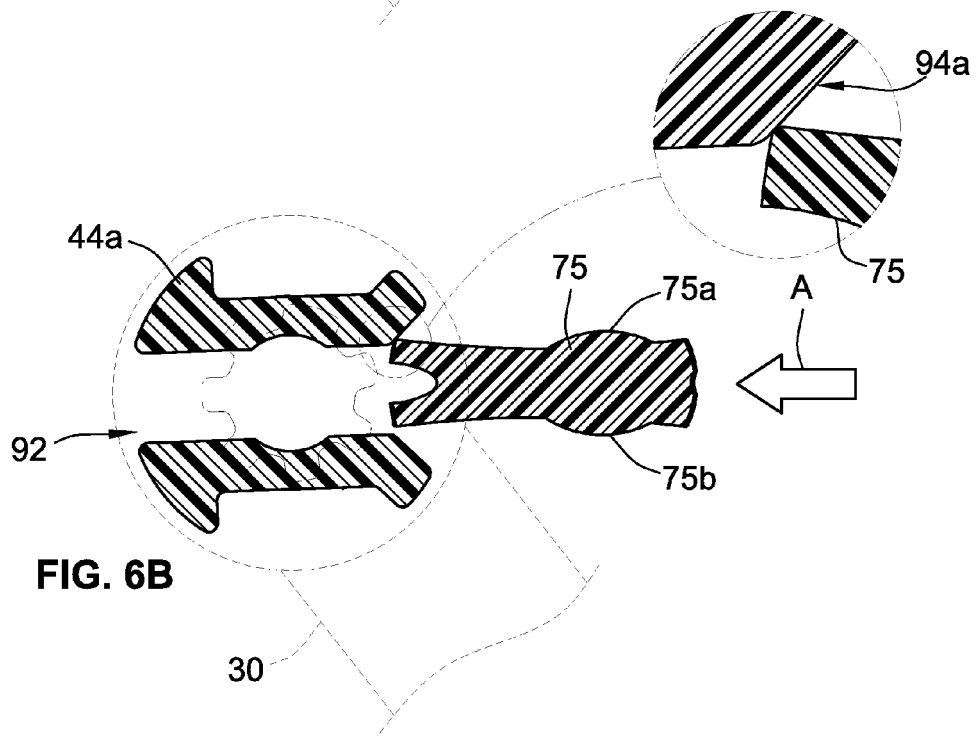

As the moveable bracket 50 is rotated, eventually the handle 75 approaches the tapered entrance of the slot 92. In some instances, if the handle 75 is not perfectly aligned with the slot 92, a leading portion of the device handle 75 can contact one or both of the tapered portions 94a,b. As shown in FIG. 6B, the leading portion of the handle 75 is in contact with the tapered portion 94a of the first finger 90a because the handle 75 was not perfectly aligned with the slot 92 in this illustrative example. A non-perfect alignment is normal and can occur due to a variety of reasons, such as, for example, during a service of the electrical enclosure 10, an operator can move the handle 75 slightly without turning the electrical device 70 ON. As the moveable bracket 50 continues to move and/or rotate into the second-bracket position, the tapered portions 94a,b aid in guiding the handle 75 into the slot 92.

Figure 6C:
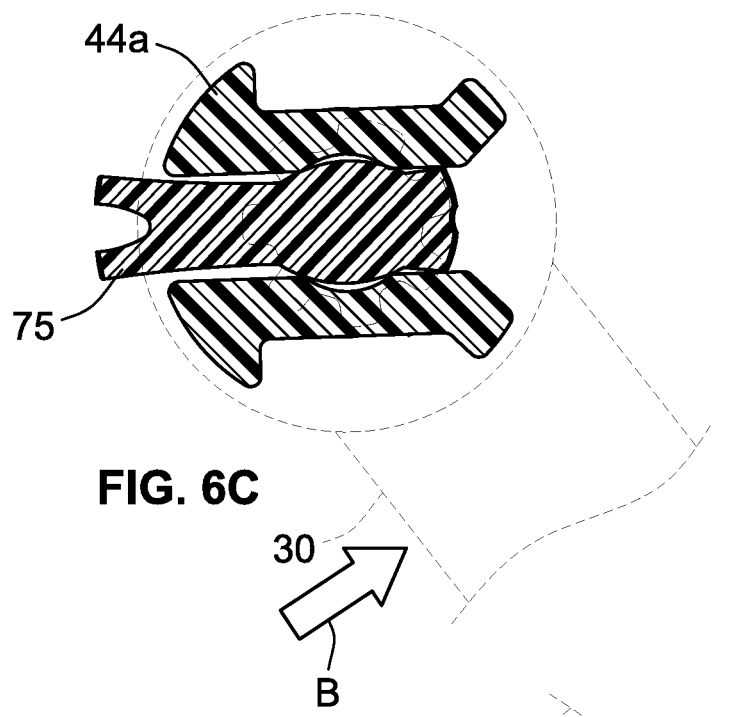

Eventually, when the moveable bracket 50 is in the second-bracket position and the electrical device is in the operational position, the handle 75 is completely seated in the slot 92 such that the protrusions 75a,b engage the corresponding grooves 96a,b in a snap fitting manner as shown in FIG. 6C.

As shown in FIG. 6C, the electrical device 70 is in the operational position, but still remains in the OFF position as the lever 30 is still in the first-lever position. Had the lever 30 not have been in the first-lever position when the moveable bracket 50 was moved into the second-bracket position, the slot 92 of the drive cog 44a would not have been aligned to receive the handle 75 and the moveable bracket 50 would have been prevented from moving completely into the second-bracket position.

Similarly, had the handle 75 of the electrical device 70 not have been in the OFF position when the moveable bracket 50 moved into the second-bracket position, the handle 75 of the electrical device 70 would not have been aligned to enter the slot 92 of the drive cog 44a and the moveable bracket 50 would have been prevented from moving completely into the second-bracket position.

Figure 6D:
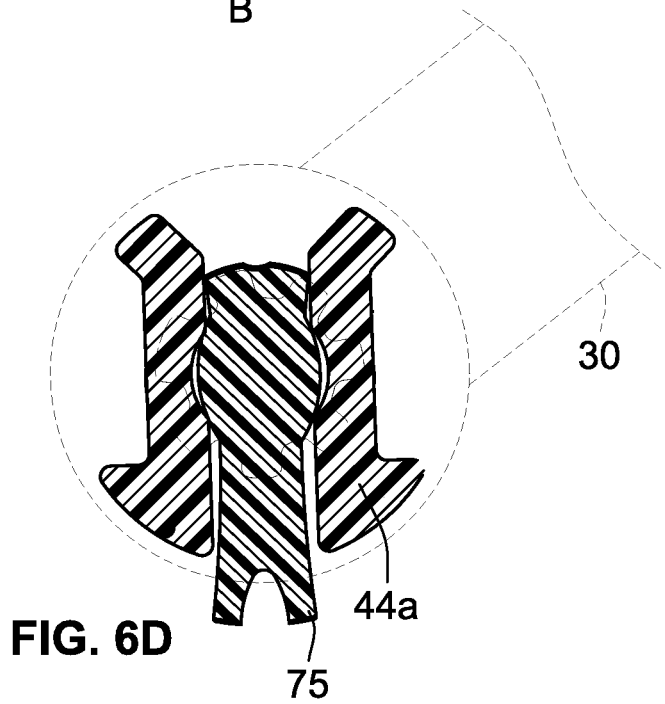

Once the handle 75 is properly seated in the slot 92 of the drive cog 44a, the lever 30 can be moved from the first-lever position (FIG. 6C) into the second-lever position (FIG. 6D). Such a movement of the lever 30 causes the drive cog 44a to rotate, which directly moves the handle 75 from the OFF position (FIG. 6C) to the ON position (FIG. 6D). Similarly, the lever 30 can be moved from the second-lever position (FIG. 6D) back into the first-lever position (FIG. 6C) to directly move the handle 75 from the ON position (FIG. 6D) to the OFF position (FIG. 6C).

Alternatively to the door 24 being hingedly coupled to the body 22 as described above, the door 24 can be coupled to and/or attached to the body 22 via one or more screws, nuts and bolts, hooks, etc.

Alternatively to the lever 30 being positioned outside of the housing 20 and adjacent to the side wall 22c, the lever 30 may be positioned outside of the housing 20 and adjacent to the side wall 22b.

While only one specific type of electrical device 70 is positioned in the electrical enclosure 10, it is contemplated that various numbers and types of electrical devices can be positioned in electrical enclosure 10. For example, in addition to or in lieu of the electrical device 70 shown in FIGS. 1A-3B, the electrical enclosure 10 can include one or more single-phase, dual-phase, and/or three-phase circuit breakers.

While the above disclosure includes a moveable bracket 50 in the electrical enclosure 10, in some alternative embodiments, an electrical enclosure of the present description need not include a moveable bracket. In some such alternatives, an electrical device can be coupled directly to the body 22 of the housing 20. Such coupling can be non-moveable such that the electrical device is rigidly installed in the electrical enclosure and remains in an operational position, similar to the operational position of the electrical device 70 described herein.

While the drive cog 44a and the lever 30 are configured to rotate in a one-to-one relationship, the drive assembly 40 can alternatively be configured to provide mechanical advantages such that the relationship of the lever 30 and drive cog 44a is different than one-to-one. For example, in some alternatives, the drive assembly 40 can increase the relationship to a one-to-two relationship such that a fifteen degree rotation of the lever 30 results in a thirty degree rotation of the drive cog 44a. For another example, in some alternatives, the drive assembly 40 can decrease the relationship to a two-to-one relationship such that a ninety degree rotation of the lever 30 results in a forty-five degree rotation of the drive cog 44a.

Alternatively to the axes 80a,b,c being coaxial, the axis of rotation 80a of the lever 30 can be parallel with, but not coaxial with, the central axis 80b of the drive cog 44a and/or the axis of rotation 80c of the handle 75 (when the electrical device 70 is in the operational position). In yet another alternative, the axis of rotation 80a of the lever 30 is not parallel with, nor coaxial with, the central axis 80b of the drive cog 44a and/or the axis of rotation 80c of the handle 75 (when the electrical device 70 is in the operational position).

While particular aspects, embodiments, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the present disclosure as defined in the appended claims.

What is claimed is:

1. A panelboard, comprising:
a housing having a body and a door coupled to the body;
a moveable bracket positioned within the body and coupled thereto, the moveable bracket being configured to be coupled to a circuit breaker having a handle moveable between an ON position to an OFF position, the moveable bracket being moveable between a first-bracket position wherein the circuit breaker is in a service position and a second-bracket position wherein the circuit breaker is in an operational position;
a lever positioned outside of the housing and configured to switch between a first-lever position a second-lever position; and
a drive assembly at least partially protruding through an aperture of the body and operatively coupled to the lever, the drive assembly including a drive cog, the drive cog being positioned within the body of the housing and being configured to directly move the handle of the circuit breaker from the OFF position to the ON position when (1) the moveable bracket is in the second-bracket position such that the circuit breaker is in the operational position and (2) the lever is switched between the first-lever position and the second-lever position.

2. The panelboard of claim 1, wherein the drive cog includes a slot configured to receive the handle of the circuit breaker when the moveable bracket is in the second-bracket position placing the circuit breaker in the operational position.

3. The panelboard of claim 2, wherein an entrance to the slot is at least partially tapered inward to aid in receiving the handle of the circuit breaker when the moveable bracket is moved from the first-bracket position to the second-bracket position.

4. The panelboard of claim 2, wherein the drive cog includes a pair of fingers, the pair of fingers being spaced apart to define the slot therebetween.

5. The panelboard of claim 2, wherein the slot includes one or more grooves configured to receive one or more corresponding protrusions on the handle of the circuit breaker.

6. The panelboard of claim 5, wherein the one or more protrusions on the handle are configured to engage the one or more corresponding grooves in the slot in a snap-fitting manner.

7. The panelboard of claim 6, wherein the engagement of the one or more protrusions and the one or more recesses provides tactile feedback to aid in indicating that the handle is properly seated within the slot of the drive cog.

8. The panelboard of claim 1, wherein the lever and the drive cog rotate coaxially.

9. The panelboard of claim 8, wherein the handle of the circuit breaker rotates coaxially with the lever and the drive cog only when the moveable bracket is in the second-bracket position placing the circuit breaker is in the operational position.

10. An electrical enclosure, comprising:
a housing having a door coupled to a body;
an electrical device coupled to an inner surface of the body of the housing, the electrical device having a handle moveable between an OFF position and an ON position;
a lever operatively coupled to the handle of the electrical device via a drive cog, the drive cog having an at least partially tapered slot configured to receive the handle of the electrical device, the drive cog being operable to directly move the handle from the OFF position to the ON position when the lever is moved between a first-lever position and a second-lever position,
wherein the drive cog includes a pair of fingers, the pair of fingers being spaced apart to define the at least partially tapered slot therebetween.

11. The electrical enclosure of claim 10, wherein the pair of fingers are resilient.

12. The electrical enclosure of claim 10, wherein the lever is entirely outside of the housing and the drive cog is entirely within the housing.

13. The electrical enclosure of claim 10, wherein the electrical device is hingedly coupled to the inner surface of the body via a moveable bracket such that the electrical device can pivot via the moveable bracket between a service position and an operating position.

14. The electrical enclosure of claim 13, wherein a portion of the electrical device protrudes from the body when the electrical device is in the service position and wherein the electrical device is entirely within the body when the electrical device is in the operating position.

15. The electrical enclosure of claim 13, wherein the lever is only operatively coupled to the handle via the drive cog when the electrical device is in the operating position.

16. An electrical enclosure, comprising:
a housing having a door coupled to a body;
an electrical device coupled to an inner surface of the body of the housing, the electrical device having a handle moveable between an OFF position and an ON position;

a lever positioned outside of the housing and configured to switch between a first-lever position and a second-lever position; and a drive assembly at least partially protruding through an aperture of the body and operatively coupled to the lever, the drive assembly including a drive cog, the drive cog being positioned within the body and having a slot configured to receive the handle of the electrical device, the drive cog being operable to directly move the handle from the OFF position to the ON position when the lever is moved between the first-lever position and the second-lever position, wherein the drive cog includes a pair of fingers, the pair of fingers being spaced apart to define the slot therebetween.

17. The electrical enclosure of claim 16, wherein the pair of fingers are resilient.

18. The electrical enclosure of claim 17, wherein an entrance to the slot is at least partially tapered to aid in receiving the handle of the electrical device.

\* \* \* \* \*